C. J. SMITH.
SLEET CUTTER.
APPLICATION FILED NOV. 1, 1911.
1,057,179.
Patented Mar. 25, 1913.
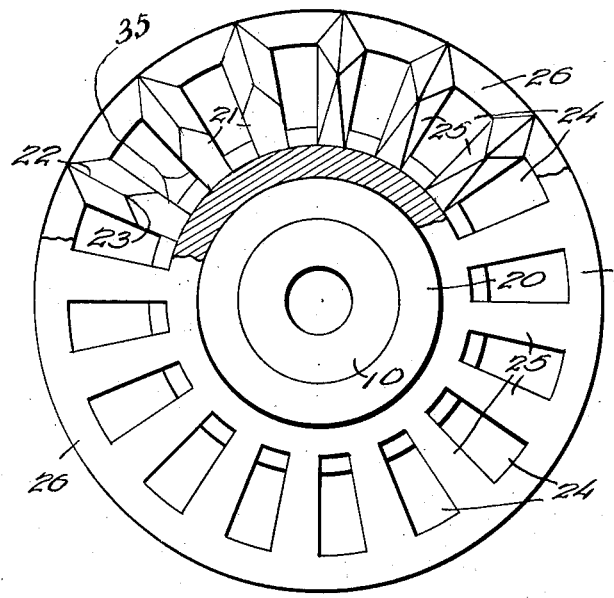
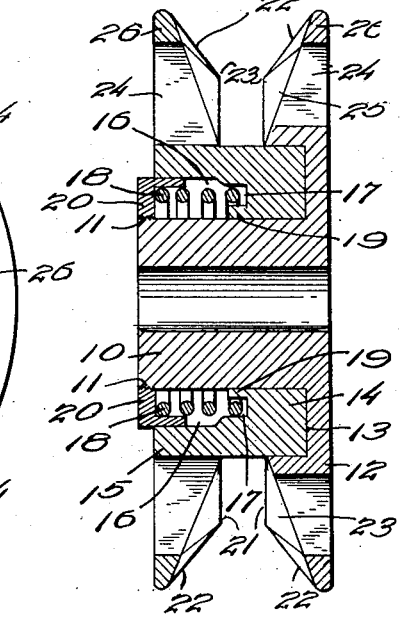
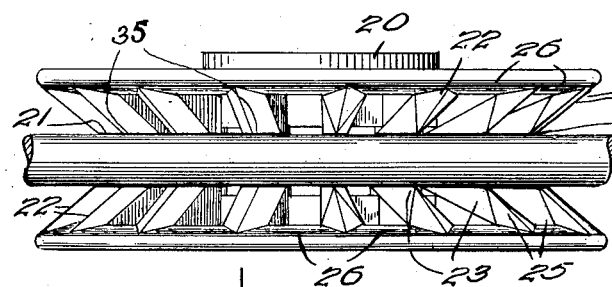
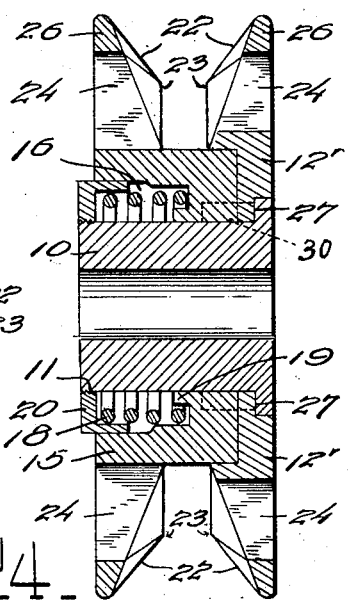
Inventor
C. J. Smith,
By H. L. Woodward
Attorney
Witnesses

UNITED STATES PATENT OFFICE.

CHARLES J. SMITH, OF ALTOONA, IOWA.

SLEET-CUTTER.

1,057,179.  Specification of Letters Patent.  Patented Mar. 25, 1913.

Application filed November 1, 1911. Serial No. 657,930.

*To all whom it may concern:*

Be it known that I, CHARLES J. SMITH, a citizen of the United States, residing at Altoona, in the county of Polk and State of Iowa, have invented new and useful Improvements in Sleet-Cutters, of which the following is a specification.

This invention relates to trolley wheels, and has for its object to provide a wheel adapted to make an efficient contact, whereby sparking will be reduced and the pitting and rapid wear of wire reduced.

It is also an object to adapt the device to rapidly remove ice or sleet from the wire and make contact therewith while moving rapidly.

It is an important object to enable the construction of a device accomplishing the above functions in a simple manner so that it may be produced at a low cost and thus actually available for use. It will be appreciated that only a very small expense for trolley-wheels can be permitted by trolley companies, and on account of the large number worn out, any complication of their manufacture might tend to make their cost such that they could not be profitably used.

It will be understood that a sharp pointed element is better adapted to effect a quick entry into a body of ice than one having an edge, which will become more or less flattened from wear if not so at first. It is therefore an object to provide a trolley wheel having pointed elements arranged to engage ice and sleet upon a wire, without liability of their engaging the wire itself and increasing its wear.

Other objects and advantages will be apparent from the following descriptions and from the drawings, in which—

Figure 1 is a side view of my wheel with a part broken away to show the spoke faces, three spokes of one form and three of another being shown on the right and left respectively. Fig. 2 is a vertical sectional view thereof. Fig. 3 is a top view, showing the engagement of the wire by the wheel and the disposition of the ice engaging points with relation to the wheel, spoke constructions corresponding to those in Fig. 1 being shown in the corresponding positions. Fig. 4 is a sectional view of a modification of the device.

There is illustrated a wheel comprising the hub portion 10, adapted to be journaled as ordinary trolley wheels are, in a trolley harp, and comprising a cylindrical body threaded at one end, as at 11. At its opposite end there is carried the integral wheel flange 12, to be described. A concentric annular recess 13 is formed in this flange adjacent the hub, into which fits a sleeve 14 carried by the opposite flange 15 of the wheel and engaged slidably upon the hub. This movable flange is provided on its outer side with a concentric cylindrical recess 16 reduced in diameter at its inner end as at 17 to form a seat for a helical spring 18. The recess 16 may be open on its inner side as far as the seat portion, or, as shown, for a large part of the distance, leaving a low flange 19 next to the hub, whereby the spring will be held away from the hub. Bearing upon the spring there is a flanged collar 20 threaded upon the outer end of the hub, whereby the sleeve 14 is forced to the inner end of the recess 13 of the flange 12, and the two flanges held yieldably in their closest relation. The flange of the collar 20 engages closely around the spring 18 holding it against loose lateral movement, and also fits snugly within the enlarged part of the recess 16 for reciprocation therein as will be explained.

In their initial position the flanges are to be spaced with their outer portions 22 adapted to receive a trolley wire of normal size therebetween, while their inner contact portions 21 are spaced less than the diameter of the wire. The sides of the groove of the wheel for holding the wire are formed by the faces 21, and the intervening portion of the hub forms the bottom of the groove. This portion of the hub may be transversely rectilinear or curved as most desirable. The outer groove sides 22 of the flanges are inclined outward with greater divergence than the inner groove sides, an angle 23 being thus formed at their junction. A multiplicity of clearing passages 24 are formed through each of the flanges arranged concentrically, each extending from a point adjacent the hub 10 for a major part of the depth of the groove, stopping intermediately of the portion 23 of the flanges. Cutter spokes 25 are thus formed. The spokes are connected at their outer ends by a narrow rim portion 26, and the spokes are continued over the inner side of the rim in relief. The spokes are beveled on each side to a central cutting edge on the outer groove sides, and upon the inner groove side only for the short distance indicated at 25 in Fig. 2, whereby points are formed on each at the angle 23.

It may be found desirable in use to initially space the opposed angular portions 23 at a distance less than the normal diameter of trolley wire in order that wires considerably worn may be readily engaged. As may be seen from Fig. 3 after a wire has become properly engaged with the device, the points 23 are held away from the wire so that it will not become gouged.

In use, the parts being assembled as described, and engaged with a harp, it will be seen that the wire will be effectively engaged on each side by the portions 21 of the flanges, whereby the sparking due to the bouncing action of the wheel upon the wire will be obviated and a continuous contact maintained. The tension of the spring 18 holding the flanges in operative relation need not be very powerful, and should be such as to allow the wire to bear against the bottom of the groove freely.

When there is sleet upon the wire, it will be apparent that the outer beveled edges of the spokes may be readily forced therethrough and this action will be made more certain by the angular point at 23. The sleet dislodged readily makes its escape through the passages 24, and the wheel cannot become packed with ice.

In Fig. 4 there is shown a modification of the device in which to lessen expense of renewals, the hub portion is made separate from the flanges 12, a shoulder 27 being formed at the end of the hub opposite its threaded end, against which the flange 12' is held by the movable flange 15 when not in use, the flange 12' being suitably bored for engagement over the hub and recessed on its outer side for the reception of the shoulder 27. When in use the flange 12' will be held in place by the trolley wire bearing thereagainst.

If it is desired to guard positively against rotation of the flanges upon the hub, it will of course be understood that suitable ribs as indicated at 30 in Fig. 4, or other customary means provided on the hub to engage one or both of the flanges.

It will be understood that the inner groove sides of the spokes may be made flat as indicated at 35 in Figs. 1 and 3, whereby wear of the wheel and wire may be lessened, while the upper portion only may be beveled to present a cutting edge and angular point 23 in such position as to act upon ice without damage to the wire.

What is claimed is:

1. A device of the class described comprising a cylindrical hub, a stationary flange at one side, a movable flange mounted reciprocably at the opposite side, the first named flange having a concentric recess therein, the movable flange having a sleeve thereon engaging slidably in the recess and adapted to hold the flanges in spaced relation, the movable flange having a concentric recess therein opening on its outer face and against the hub, the hub being threaded there adjacent, a retaining collar engaged upon the hub outwardly of the movable flange and snugly in the last named recess, and a resilient element confined between the collar and movable flange for the purpose described.

2. In a trolley wheel, relatively movable resiliently held flange elements spaced and shaped to form a groove and having a multiplicity of concentrically arranged passages therethrough opening on the groove for the major part of its depth and on the outer sides of the flange elements, the intermediate surfaces of the flanges being extended in close parallel spaced relation for frictional engagement with the sides of a wire and being beveled between the passages immediately adjacent their junction with the outer parts, the outer parts of the flanges extending divergently and obliquely outward with respect to said inner surfaces, the portions between the passages being beveled on each side to form cutting edges and ice piercing points at the intersection thereof with the inner surfaces, the inner groove faces being flat, whereby the ice breaking points may be presented in engagement with ice immediately against a wire without pricking the wire, as described.

3. In a device of the class described, a hub threaded at one end and having an integral trolley flange at the other, said flange having a concentric recess therein a second flange reciprocable on the hub and having a sleeve portion engaging slidably in the recess to hold the flanges in spaced relation, the last named flange having a recess on its outer side concentric with the hub, resilient means engaged in the recess spaced from the hub, and a collar member threaded on said threaded end of the hub and bearing upon the spring to hold the flanges yieldably against relative movement away from each other.

In testimony whereof I have hereunto set my hand in presence of two subscribing witnesses.

CHARLES J. SMITH.

Witnesses:
T. A. VERSAW,
N. B. SHAFFER.

---

Copies of this patent may be obtained for five cents each, by addressing the "Commissioner of Patents, Washington, D. C."